Jan. 1, 1924
G. DOMINGUEZ
TRANSMISSION
Filed May 20, 1922
1,479,702
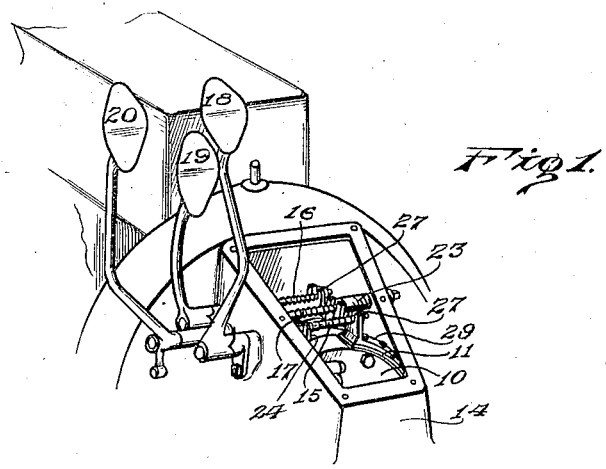
Fig. 1.
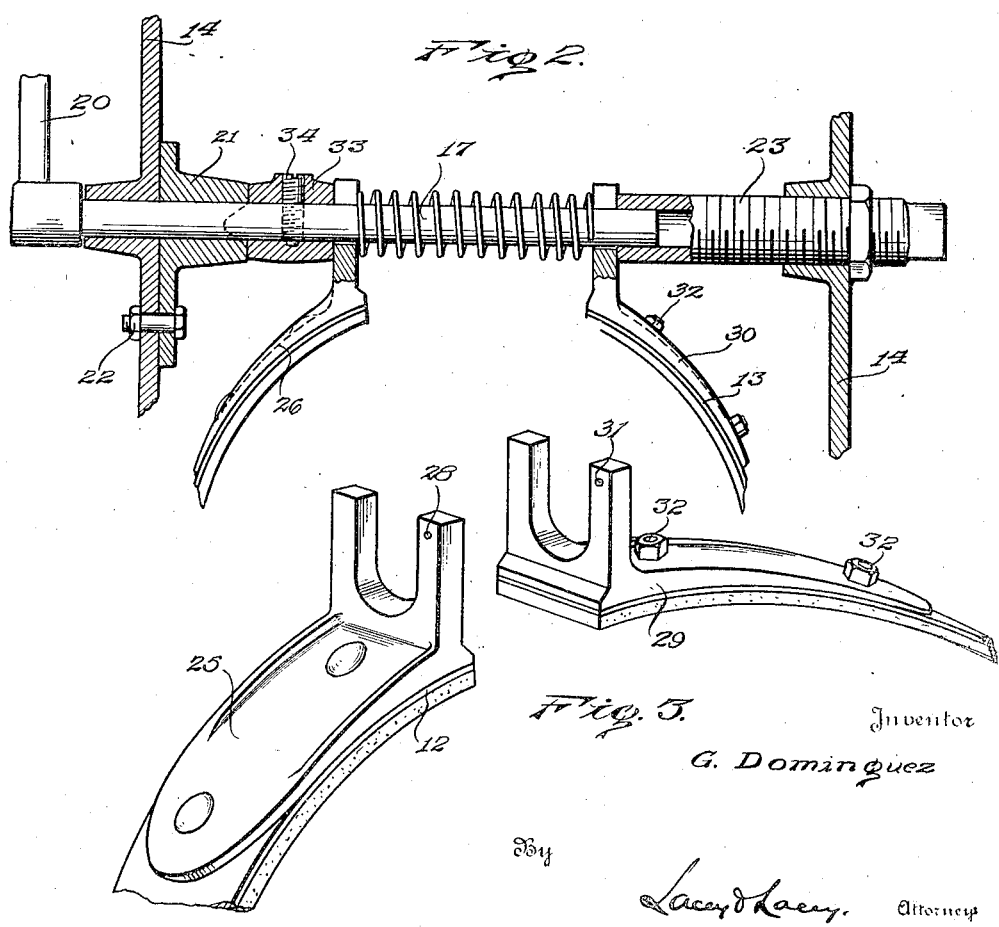
Fig. 2.
Fig. 3.
Inventor
G. Dominguez
By Lacey & Lacey, Attorney Patented Jan. 1, 1924.

1,479,702

UNITED STATES PATENT OFFICE.

GABINO DOMINGUEZ, OF MORLEY, COLORADO.

TRANSMISSION.

Application filed May 20, 1922. Serial No. 562,357.

*To all whom it may concern:*

Be it known that I, GABINO DOMINGUEZ, citizen of the United States, residing at Morley, in the county of Las Animas and State of Colorado, have invented certain new and useful Improvements in Transmissions, of which the following is a specification.

This invention seeks, as one of its principal objects, to provide a transmission wherein the transmission bands may be removed without the necessity of displacing the transmission case cover.

A further object of the invention is to provide a transmission wherein the low speed pedal shaft may be readily released and withdrawn to permit removal of the low speed band.

And the invention has as a still further object to provide a transmission wherein corresponding ear irons of all of the transmission bands of the transmission may be displaced to permit endwise removal of said band.

Other and incidental objects will appear hereinafter.

In the drawing:

Figure 1 is a perspective view showing a transmission modified in accordance with the present invention.

Figure 2 is an enlarged sectional view showing the low speed pedal shaft and associated parts, and Figure 3 is a fragmentary perspective view showing one of the transmission bands.

My invention relates particularly to that type of automobile transmission in which a plurality of rotatable drums, each partially encircled by a resilient band, are all enclosed within a transmission gearing. The usual drums of the transmission are indicated at 10, said drums being three in number and surrounding said drums are transmission bands which, for convenience, have been indicated at 11, 12 and 13, respectively, the band 11 being a brake band, the band 12 a reverse band, and the band 13 a low speed band, the bands 12 and 13 being hidden by the band 1 in Fig. 1. The drums are housed in the usual transmission case including a transmission case cover 14, and journaled through the cover at one side thereof are pedal shafts 15, 16 and 17, respectively. The shaft 15 carries a brake pedal 18, the shaft 16 a reverse pedal 19, and the shaft 17 a low speed pedal 20. Fixed against the inner side of the cover is, as shown in Figure 2, a low speed pedal shaft support 21 receiving the shaft 17 therethrough and securing said support is a bolt 22, the shaft being journaled at its inner end by an adjusting screw 23 threaded through the wall of the cover at the side thereof opposite the support. Mounted upon the transmission bands 11, 12 and 13, at corresponding ends thereof, are the usual ear irons 24, 25 and 26 respectively, permanently fixed to said bands. The structure thus far described is all conventional with the exception that, for the purpose of the present invention, corresponding ears of the ear irons 24 and 25 are, as shown in Figure 3, provided with openings 28.

In carrying the invention into effect, I employ upon the transmission bands 11 and 12 removable ear irons 29 and upon the transmission band 13 a removable ear iron 30. These ear irons are similar to the ear irons 24, 25 and 26 and corresponding ears of the ear irons 29 and 30 are provided with openings 31. Detachably securing said ear irons to the bands are bolts 32 and, as shown in Figure 1, the shafts 15 and 16 are provided at their inner ends with the customary nuts 27 to operatively coact with the ear irons 29 while the adjusting screw 23 coacts with the ear iron 30 of the low speed band. Mounted upon the shaft 17 is a collar 33 commonly called the slow speed notch, this collar being notched at one end thereof to provide cam faces coacting with similar cam faces at the notched inner end of the shaft support so that when the pedal 20 is rocked the cam faces of the collar will ride over the cam faces of the shaft support for shifting the shaft endwise. The cam faces mentioned are of conventional construction. Threaded upon the collar to extend through the shaft is a locking screw 34 detachably connecting the collar with the shaft. Under present practice, the collar is connected with the shaft 17 by a pin driven through the collar and shaft so that it is thus difficult to remove the collar. The collar 33 coacts with the ear iron 26 while the ear irons 24 and 25 upon the bands 11 and 12 coact with the inner ends of the bearings for the shafts 15 and 16 in the usual manner so that when the shafts are rocked the bands will be contracted about the transmission drums.

As shown in Figure 1, the transmission cover 14 is provided with the usual door opening and to remove the bands the customary door for said opening is first displaced when the screw 34 of the collar 33 is removed to release the shaft 17. This shaft is then drawn endwise through the shaft support 21 to release the low speed band 13 when said collar is removed from the shaft. The bolt 22 of the shaft support 21 is then removed and said shaft support displaced when the band 13 is rotated upon its drum to dispose the ear iron 30 at the top of the drum. The bolts 32 may then be removed and the ear iron 30 of said band displaced when the ear iron 26 of the band may be grasped and the band pulled endwise from around the drum through the door opening in the transmission cover. Having thus displaced the low speed band, the nuts 27 upon the shafts 15 and 16 are displaced when these shafts are pulled endwise to release the bands 11 and 12. The ear irons 29 of these bands are then removed in a manner similar to that described in connection with the ear iron 30 of the band 13 when the bands 11 and 12 may be withdrawn endwise from around their drums by simply grasping the ear irons 24 and 25 and pulling thereon. Thus, as will be seen, all of the bands of the transmission may be easily displaced.

In replacing the bands, the bands 11 and 12 are first shifted endwise into position when the ear irons 29 of said bands are applied. The ends of each of these bands are then temporarily tied together by means of a suitable wire or the like engaged through the openings 28 and 31 of the ear irons of said bands so that the bands will be retained in operative position about their drums. The low speed band 13 is then moved endwise about its drum and the ear iron 30 applied when the ends of this band are temporarily tied together in a manner similar to the other bands. The shaft support 21 is then secured in position by the bolt 22 when the low speed pedal 17 is shifted inwardly to normal position, the collar 33 being coincidently applied to said shaft.

The ends of the band 13 are then released to assume their normal position as are also the ends of the bands 11 and 12, the nuts 27 being, of course, duly applied to the ends of the shafts 15 and 16. I accordingly provide a transmission wherein the transmission bands may be removed or replaced with a minimum of difficulty and without the necessity for removing the transmission cover. A great deal of labor and time will thus be saved.

Having thus described the invention, what is claimed as new is:

1. In a vehicle transmission, the combination of a transmission case, drums therein, transmission bands about said drums, pedal shafts journaled through the case, ear irons upon the end of said bands operatively connecting the bands with the shafts, said ear irons being constructed to receive means for temporarily holding them together, and means detachably connecting one of the ear irons of each band thereto.

2. In a vehicle transmission, the combination of a transmission case, drums therein, transmission bands about said drums, pedal shafts journaled through the case, ear irons upon the ends of said bands operatively connecting the bands with the shafts, a removable support for one of the shafts, and a removable collar upon said shaft bearing against said support.

3. In a vehicle transmission, the combination of a transmission case, drums therein, transmission bands about said drums, pedal shafts journaled through the case, ear irons upon the ends of said bands operatively connecting the bands with the shafts, and means detachably connecting one of the ear irons of each band thereto, one of the ears of each of said ear irons being formed with an opening therethrough to accommodate a fastening element temporarily connecting the ends of each of the bands.

In testimony whereof I affix my signature.

GABINO DOMINGUEZ. [L. S.]